United States Patent
Kim et al.

(10) Patent No.: US 8,229,270 B2
(45) Date of Patent: Jul. 24, 2012

(54) METHOD AND APPARATUS FOR COMPENSATING AUDIO/VIDEO SYNCHRONIZATION

(75) Inventors: Seung-hoon Kim, Seoul (KR); Chang-yong Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1556 days.

(21) Appl. No.: 11/708,044

(22) Filed: Feb. 20, 2007

(65) Prior Publication Data

US 2007/0248123 A1 Oct. 25, 2007

(30) Foreign Application Priority Data

Apr. 21, 2006 (KR) ........................ 10-2006-0036340

(51) Int. Cl.
*H04N 5/932* (2006.01)
*H04N 5/935* (2006.01)
*H04N 5/92* (2006.01)
*G11B 11/00* (2006.01)
*G06T 11/20* (2006.01)

(52) U.S. Cl. ........ 386/201; 386/214; 386/217; 386/220; 386/326; 369/13.35; 345/440

(58) Field of Classification Search ................. 386/201, 386/214, 217, 220, 326; 345/440; 369/13.35
See application file for complete search history.

(56) References Cited

U.S. PATENT DOCUMENTS 5,771,075 A * 6/1998 Rim et al. ..................... 348/512
5,812,201 A * 9/1998 Yoo ............................. 348/423.1

* cited by examiner

*Primary Examiner* — Daquan Zhao
(74) *Attorney, Agent, or Firm* — Sughrue Mion, PLLC

(57) ABSTRACT

An audio and video synchronization compensation method and apparatus for smoothly compensating audio and video synchronization in an audio and video system such as a DTV and a DVD player are provided. The apparatus includes a signal decoder unit which extracts time information for reproducing a video and/or audio signal and reference operation time information of a reproduction system from an input compressed stream; a signal synchronization control unit which determines the reproduction state of a signal by comparing reproduction time information of the stream with reference time information of the system, measures the difference between the reproduction time information and the reference time information in the determined signal reproduction state, and adjusts a transition speed used to approach from a signal reproduction interval to a signal synchronization interval according to a reproduction speed value of a pattern corresponding to the difference.

7 Claims, 5 Drawing Sheets

FIG. 3

| DIFFERENCE OF PTS AND STC | APPROACH SPEED VALUE |
|---|---|
| 10000 | 3 |
| ⋮ | ⋮ |
| 8000 | 2 |
| ⋮ | ⋮ |
| 3000 | 1 |
| ⋮ | ⋮ |
| 1500 | 0.5 |
| ⋮ | ⋮ |
| 500 | 0.25 |
| ⋮ | ⋮ |

METHOD AND APPARATUS FOR COMPENSATING AUDIO/VIDEO SYNCHRONIZATION

CROSS-REFERENCE TO RELATED PATENT APPLICATIONS

This application claims priority from Korean Patent Application No. 10-2006-0036340, filed on Apr. 21, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to an audio and/or video reproduction system, and more particularly, to an audio and video synchronization compensation method and apparatus for smoothly compensating synchronization of audio and video signals in an audio and video system, such as a DTV and a DVD player.

2. Description of the Related Art

Generally, a compressed signal reproduction system restores audio and video data from an MPEG2 transport stream or a program stream.

Since this compressed signal reproduction system uses a multiplexed digital signal, the system requires a separate audio and/or video (A/V) lip-synchronization apparatus or method to synchronize video and audio signals, unlike in existing analogue systems.

In addition to a video stream and an audio stream, a bitstream includes a system time clock (STC) corresponding to reference time information of a system and a presentation time stamp (PTS) indicating a time when restored data is to be reproduced, wherein the time is expressed with respect to the STC.

Accordingly, the compressed signal reproduction system checks the PTS with respect to the STC in each picture, and if the PTS exceeds a predetermined error range, the system adjusts the A/V lip-synchronization by using a skip or wait operation.

FIG. 1 is a graph explaining audio and video synchronization in a compressed signal reproduction system in the related art.

Referring to FIG. 1, an A/V synchronization interval 1 is a period of time in which audio and video signals are synchronized with an STC.

Reproduction intervals 2 and 3 are periods of time in which a video signal is displayed on a screen or an audio signal is output to a speaker according to a PTS.

Accordingly, if the PTC value of the current reproduction interval 2 and 3 is less than the STC value of the A/V synchronization interval 1, the compressed signal reproduction system skips a video or audio signal in units of frames (skip case). If the PTC value of the current reproduction interval 2 and 3 is greater than the STC value of the A/V synchronization interval 1, the compressed signal reproduction system waits for a video or audio signal in units of frames (wait case).

However, in the related art, if reception of radio waves is cut off due to an inferior environment or the system becomes unstable due to temperature changes, the difference between the STC time and the PTS time becomes large. As a result, if the difference between the STC time and the PTS time is too large, synchronization of audio and video signals takes more time, which may cause broken sound or broken screen phenomena.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The exemplary embodiments provide an audio and video synchronization compensation method which smoothly synchronizes audio and video signals by determining a skip value or a wait value of a signal corresponding to the difference between signal reproduction time information extracted from a compressed stream and reference time information of a system by using a table having approach speed value patterns.

An aspect of the present invention also provides an audio and video synchronization compensation apparatus for smoothly synchronizing audio and video signals by determining a skip amount or a wait amount of a signal corresponding to the difference between signal reproduction time information extracted from a compressed stream and reference time information of a system by using a table having patterns.

According to another aspect of the present invention, there is provided an audio and video synchronization compensation method including: extracting time information for reproducing a video and/or audio signal and reference operation time information of a system from an input compressed stream; determining the reproduction state of a signal by comparing the reproduction time information with the reference time information of the system; and detecting the time difference between the reproduction time information and the reference time information in the determined signal reproduction state, and adjusting a transition speed from a signal reproduction interval to a signal synchronization interval according to a reproduction speed value corresponding to the time difference.

According to another aspect of the present invention, there is provided an audio and video synchronization compensation apparatus including: an de multiplexing unit dividing a bitstream into a video and/or audio stream and reference clock information; a signal decoder unit extracting reproduction time information from a video and/or audio stream output from the de multiplexing unit and decoding the video and/or audio stream; a clock control unit controlling a system clock of the signal decoder unit according to reference clock information separated in the de multiplexing unit; and a signal synchronization control unit determining transition speed information corresponding to the difference between a reference clock time generated in the clock control unit and the reproduction time extracted in the signal decoder unit according a preset pattern, and according to the transition speed information, adjusting a skip value and a wait value of the signal decoder unit.

BRIEF DESCRIPTION OF THE DRAWINGS

The above and other features of the present invention will become more apparent by describing in detail exemplary embodiments thereof with reference to the attached drawings in which:

FIG. 3 is an approach speed value table in which approach speed values corresponding to the difference between PTS time information and STC time information are set according to an exemplary embodiment;

DETAILED DESCRIPTION OF THE INVENTION

Various aspects of the present invention will now be described more fully with reference to the accompanying drawings, in which exemplary embodiments of the invention are shown.

Figure 1:
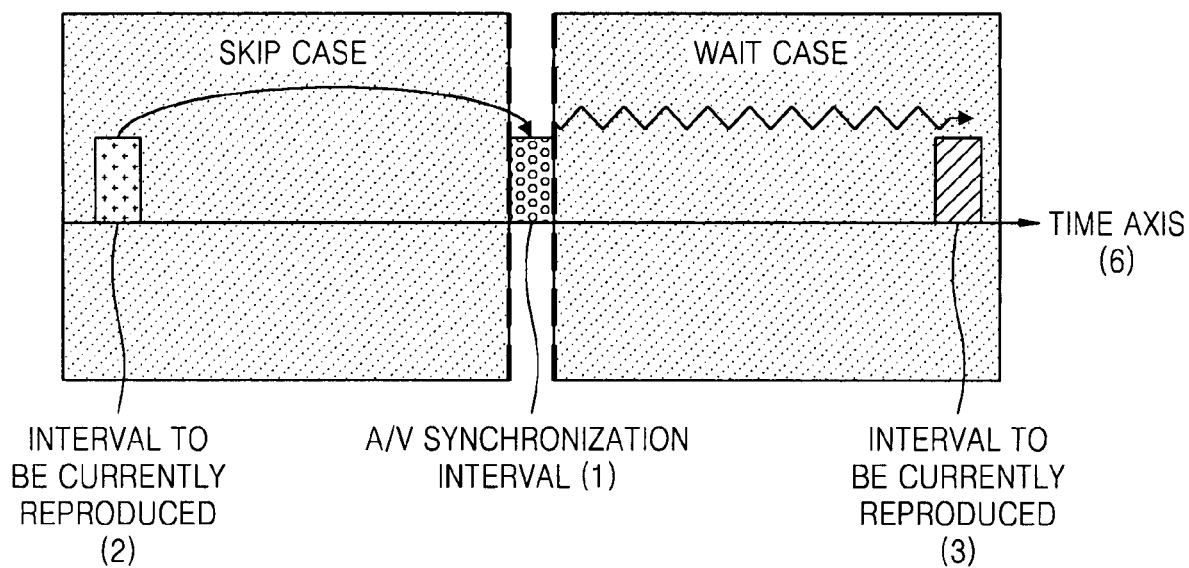
FIG. 1 is a graph explaining audio and video synchronization in a compressed signal reproduction system in the related art.
Figure 2:
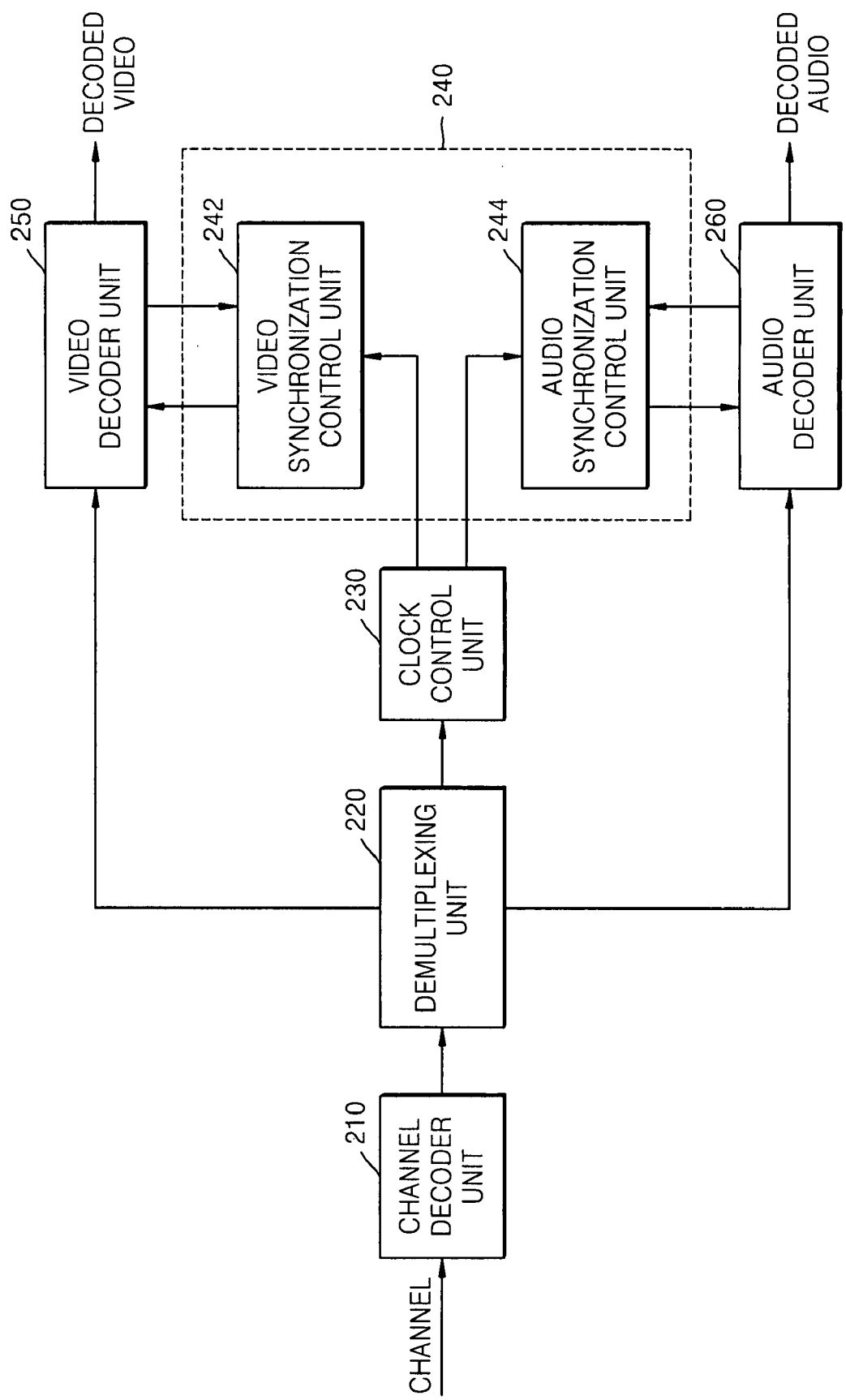
FIG. 2 is a block diagram of an audio and video synchronization compensation apparatus according to an exemplary embodiment.

FIG. 2 is a block diagram of an audio and video synchronization compensation apparatus according to an exemplary embodiment.

The audio and video synchronization compensation apparatus of FIG. 2 is composed of a channel decoder unit 210, a de multiplexing unit 220, a clock control unit 230, a signal synchronization control unit 240, a video decoder unit 250, and an audio decoder unit 260. In particular, the signal synchronization unit 240 includes a video synchronization control unit 242 and an audio synchronization unit 244.

The channel decoder unit 210 decodes a desired channel from a network or a recording medium, and outputs the signal as a MPEG-2 transport stream or a MPEG-2 program stream. Here, MPEG-2 is a draft international standard for compression encoding of digital moving pictures that is a core technology in a multimedia environment. The channel decoder unit 210 may be an advanced technology attachment packet interface capable of interfacing with an optical disk or may be a channel interface capable of reading a DTV signal. In a bitstream, a system time clock (STC) corresponding to reference time information of a system and a presentation time stamp (PTS) indicating a time when restored data is to be reproduced, which is a time expressed with respect to the STC, are multiplexed together with a video stream and an audio stream.

The de multiplexing unit 220 divides the bitstream output from the channel decoder unit 210 into a video stream, an audio stream and a system clock reference (SCR).

The video decoder unit 250 extracts video PTS information from the video stream output from the de multiplexing unit 220 and decodes the video signal according to a synchronization control signal of the signal synchronization control unit 240.

The audio decoder unit 260 extracts audio PTS information from the audio stream output from the de multiplexing unit 220 and decodes the audio signal according to a synchronization control signal of the signal synchronization control unit 240. Here, the audio stream is decoded using an MPEG algorithm or an audio coding algorithm (AC-3).

The clock control unit 230 receives SCR information output from the de multiplexing unit 220 and controls the system clock for the video decoder unit 250 and the audio decoder unit 260 in order to synchronize the audio and video signals.

By using system time clock (STC) information provided from the clock control unit 230 and PTS information extracted from the video and audio decoder units 250 and 260, the signal synchronization control unit 240 generates a synchronization control signal to synchronize the video and audio streams of the video decoder unit 250 and the audio decoder unit 260. For example, if the time of the PTS is less than the time of the STC, the signal synchronization control unit 240 performs a skip to approach A/V signal from the PTS point to the STC point, with reference to a table having approach speed value patterns. If the time of the PTS is greater than the time of the STC, the signal synchronization control unit 240 performs a wait operation to smooth the approach of the A/V signal from the PTS point to the STC point, with reference to a table having approach speed value patterns.

More specifically, the video synchronization control unit 242 determines an approach speed value corresponding to a skip amount and a wait amount of a video signal from the table, by using the STC information generated in the clock control unit 230 and the PTS information generated in the video decoder unit 250, and outputs a synchronization control signal to the video decoder unit 250 so that the video signal is decoded based on the skip amount and wait amount. Also, the audio synchronization control unit 244 determines an approach speed value corresponding to a skip amount and a wait amount of an audio signal from the table, by using the STC information generated in the clock control unit 230 and the PTS information generated in the audio decoder unit 260, and outputs a synchronization control signal to the audio decoder unit 260 so that the audio signal is decoded based on the skip amount and wait amount.

FIG. 3 is a speed value table in which values corresponding to the difference between PTS time information and STC time information are arranged in approach speed values having patterns according to an exemplary embodiment.

Referring to FIG. 3, in the speed value table, approach speed values from reproduction intervals to A/V synchronization intervals are set with respect to the time difference between the PTS and the STC. For example, if the time difference between the PTS and the STC is "10000", a approach speed value is set as "3", if the time difference is "8000", a approach speed value is set as "2", and if the time difference is "3000", a approach speed value is set as "1". The parameters in this approach speed table may be arranged in various pattern types, which may be based on experimental values. In another exemplary embodiment, approach speed values can be obtained using a function obtained by formularizing various patterns. The approach speed values may be adjusted with respect to a skip amount and a wait amount. For example, for a 3-times speed, two frames are skipped in a skip operation, for a 2-times speed, one frame is skipped in a skip operation, and for a 0.5-times speed, one frame is waited for in a wait operation. In the speed value table, values for audio signals and video signals may be separately set.

Figure 4:
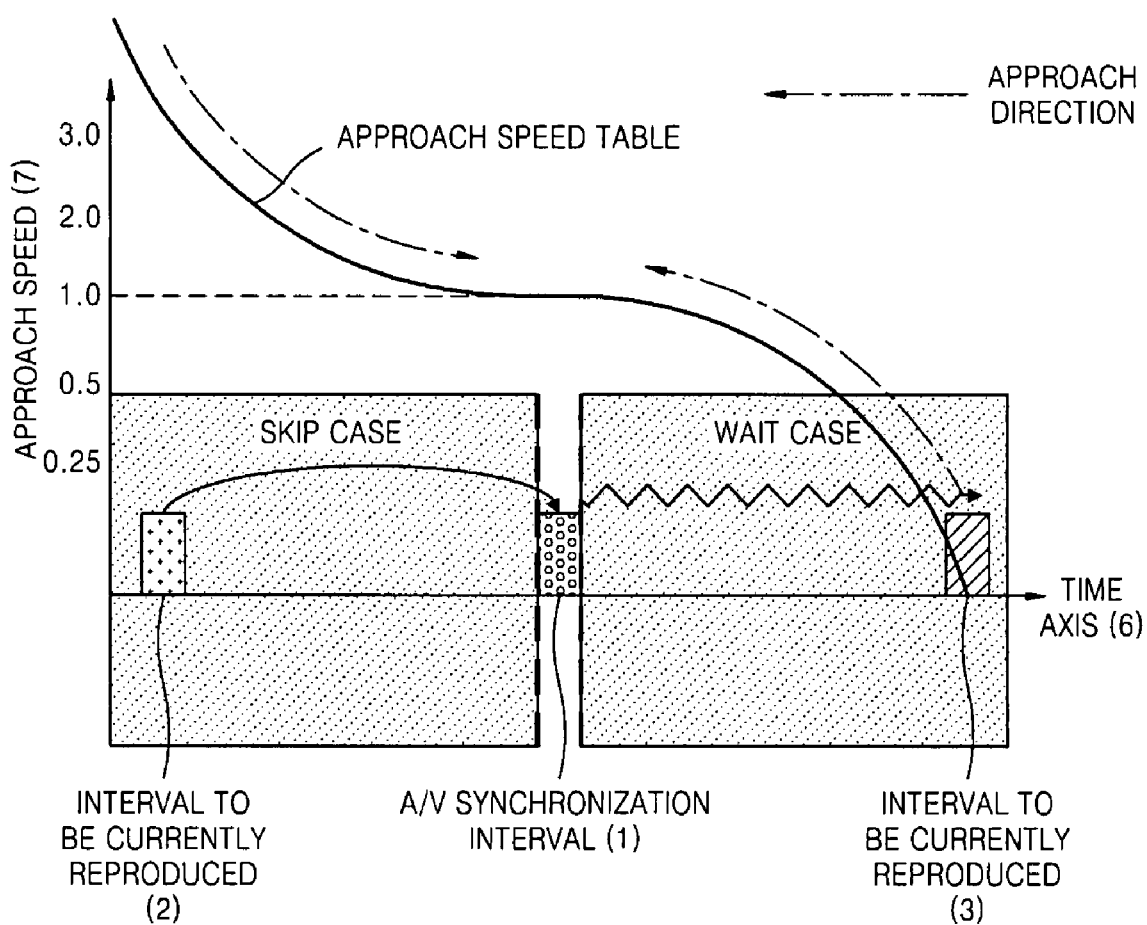
FIG. 4 is a graph illustrating audio and video synchronization compensation using a approach speed table according to an exemplary embodiment.

FIG. 4 is a graph illustrating audio and video synchronization compensation using an approach speed table according to an exemplary embodiment.

Referring to the graph of FIG. 4, the x-axis indicates time and the y-axis indicates approach speed values. In a skip region (SKIP CASE) and a wait region (WAIT CASE), the graph has a smooth curve shape corresponding to pattern data of the approach speed table in this exemplary embodiment.

An audio and video synchronization operation may include a skip operation and a wait operation. The audio and video synchronization may be adjusted through a skip or a wait operation according to where the PTS is on the time axis with respect to the STC. Also, for the audio and video synchronization, a reproduction speed used when transitioning (OR "required to transition") from a current reproduction interval to an A/V synchronization interval is determined using the table having approach speed values, such as the patterns illustrated in FIG. 3. A method of adjusting a reproduction speed in a skip state and in a wait state, respectively, will now be explained with reference to the graph of FIG. 5. First, in the skip state, since the slope of a graph according to the transition speed table is large when the current reproduction interval 2 is distant from the A/V synchronization interval 1, the A/V synchronization interval is approached at a relatively fast speed. However, the slope of a graph becomes small when the current reproduction interval 2 approaches the A/V synchronization interval 1. Accordingly, the A/V synchronization interval is approached at a slower speed as compared to the instance when the current reproduction interval 2 is distant from the A/V synchronization interval 1.

Furthermore, in a wait state, since the slope of a graph according to the transition speed table is large when the current reproduction interval 3 is distant from the A/V synchronization interval 1, the A/V synchronization interval 1 is approached at a relatively slow speed. The slope of a graph according to the transition speed table becomes small when the current reproduction interval 3 approaches the A/V synchronization interval 1. Accordingly, transitioning from the reproduction interval 3 to the A/V synchronization interval 1 is performed at a slower speed as compared to the instance when the current reproduction interval 3 is distant from the A/V synchronization interval 1. In another exemplary embodiment, by setting a graph having a shape different from that of the graph of FIG. 4 with respect to the condition of a system, an optimum transition speed table or transition speed equation suitable for a variety of systems may be generated. Also, in still another exemplary embodiment, trick plays, such as fast forward reproduction and fast reverse play, can be driven using a transition speed table having approach speed values.

Figure 5:
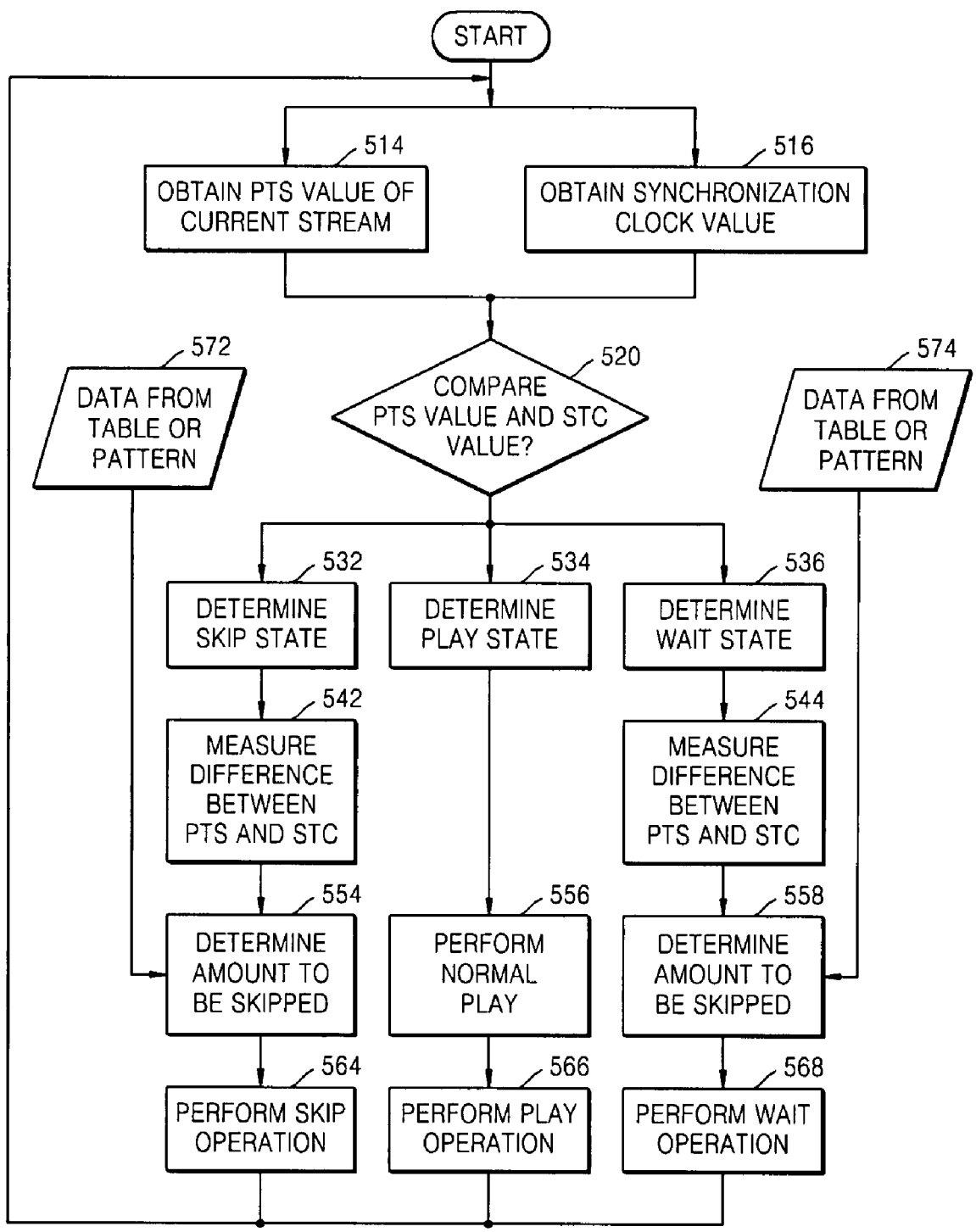
FIG. 5 is a flowchart of a method of audio and video synchronization compensation according to an exemplary embodiment.

FIG. 5 is a flowchart of a method of audio and video synchronization compensation according to an exemplary embodiment of the present invention.

First, a PTS value, which is time information for reproduction of a video and/or audio signal from an input bitstream, is extracted in operation 514. At the same time, an STC value, which is reference operation time information of a reproduction system, is extracted from the input bitstream in operation 516.

Then, by comparing the extracted PTS value and STC value, the reproduction state of a signal is determined in operation 520. That is, if the PTS value is less than the STC value, a skip state is determined in operation 532 and if the PTS value is greater than the STC value, a wait state is determined in operation 536. If the PTS value and the STC value fall within a predetermined margin, a reproduction state (or synchronization state) is determined in operation 534.

Then, according to the state of the signal reproduction (skip state, reproduction state, or wait state), a skip amount or a wait amount corresponding to the reproduction speed of a signal is determined as follows.

1) In a skip state, the difference between the PTS value and the STC value is measured in operation 542. Then, with reference to an approach speed table having approach speed values based on various patterns or an equation 572, a reproduction speed value corresponding to the difference value between the PTS value and the STC value is looked up in operation 554. For example, using the table of FIG. 3, if the time information difference is "10000", a transition speed value "3" corresponding to the time difference is read from the table, and if the time difference is "8000", a transition speed value "2" corresponding to the time difference is read from the table. Here, the read reproduction speed value is converted into a synchronization control signal corresponding to the skip value. For example, if the reproduction speed value is determined to be "3", the video decoder unit 250 or the audio decoder unit 260 performs a skip operation skipping two frames of the video or audio signal. The transition speed for this skip operation can be applied by a user in a variety of ways.

2) In a wait state, the difference between the PTS value and the STC value is measured in operation 544. Then, by using a transition speed table having predetermined patterns or a predetermined equation 574, a reproduction speed value corresponding to the difference value between the PTS value and the STC value is looked up in operation 554. Here, the reproduction speed value is converted into a synchronization control signal corresponding to the wait value. For example, if the reproduction speed value is determined to be "0.5", the video decoder unit 250 or the audio decoder unit 260 performs a wait operation waiting for two frames of the video or audio signal. The transition speed for the wait operation can be applied by a user in a variety of ways.

3) In a reproduction state, a normal reproduction is performed because video and audio signals are synchronized in operation 556.

Then, according to the determined reproduction speed value, a skip, reproduction, or wait operation is performed in 564, 566, and 568, and adjustment of a reproduction speed through a comparison of the PTS and STC values is performed again.

While the present invention has been particularly shown and described with reference to exemplary embodiments thereof, it will be understood by those of ordinary skill in the art that various changes in form and details may be made therein without departing from the spirit and scope of the present invention as defined by the following claims. These exemplary embodiments should be considered in descriptive sense only and not for purposes of limitation. Therefore, the scope of the invention is defined, not by the detailed description of the invention, but by the appended claims.

The present invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

What is claimed is:

1. An audio and video synchronization compensation method comprising:
    extracting, from an input compressed stream, reproduction time information for reproducing a video and/or audio signal and reference operation time information of a system; and
    detecting a time difference between the reproduction time information and the reference operation time information, determining a speed of transition from a signal reproduction interval to a signal synchronization interval based on the time difference and adjusting a reproduction speed of the video and/or audio signal according to the determined speed of transition,
    wherein the speed of transition is determined according to a speed value corresponding to the time difference, and
    wherein the speed of transition is determined according to a transition speed value table having approach speed values having patterns.

2. The method of claim 1, further comprising determining a reproduction state of the video and/or audio signal by comparing the reproduction time information with the reference operation time information of the system.

3. The method of claim 2, wherein in the determining of the reproduction state of the signal, if a value of the reproduction time information is less than a reference time value, a skip state is determined, if the value of the reproduction time information is greater than the reference time value, a wait state is determined, and if the value of the reproduction time information and the reference time value are within a certain margin, a reproduction state is determined.

4. The method of claim 1, wherein the time difference of the reproduction time information and the reference operation time information is a difference between a current reproduction time value extracted from a video and/or audio stream and a system reference clock value extracted from a bitstream.

5. An audio and video synchronization compensation method comprising:
   extracting, from an input compressed stream, reproduction time information for reproducing a video and/or audio signal and reference operation time information of a system; and
   detecting a time difference between the reproduction time information and the reference operation time information, determining a speed of transition from a signal reproduction interval to a signal synchronization interval based on the time difference and adjusting a reproduction speed of the video and/or audio signal according to the determined speed of transition,
   wherein the speed of transition is determined according to a speed value corresponding to the time difference, and wherein the speed of transition is determined according to an approach speed which corresponds to the time difference and is adjusted according to a function obtained by formularizing approach speed patterns.

6. An audio and video synchronization compensation method comprising:
   extracting, from an input compressed stream, reproduction time information for reproducing a video and/or audio signal and reference operation time information of a system; and
   detecting a time difference between the reproduction time information and the reference operation time information, determining a speed of transition from a signal reproduction interval to a signal synchronization interval based on the time difference and adjusting a reproduction speed of the video and/or audio signal according to the determined speed of transition,
   wherein the speed of transition is obtained by formularizing a function with the time difference between the reproduction time information and the reference operation time information and a reproduction speed of the video and/or audio signal.

7. An audio and video synchronization compensation method comprising:
   extracting, from an input compressed stream, reproduction time information for reproducing a video and/or audio signal and reference operation time information of a system; and
   detecting a time difference between the reproduction time information and the reference operation time information, determining a speed of transition from a signal reproduction interval to a signal synchronization interval based on the time difference and adjusting a reproduction speed of the video and/or audio signal according to the determined speed of transition,
   wherein in the adjusting of the reproduction speed, if a current reproduction time value is less than a system reference clock value, a skip operation to transition the video and/or audio signal from a signal reproduction point of time to a signal synchronization point of time is performed referring to a table having approach speed values having patterns, and if the current reproduction time value is greater than the system reference clock value, a wait operation to approach the video and/or audio signal from a signal reproduction point to a signal synchronization point is performed referring to a table having patterns.

* * * * *